UNITED STATES PATENT OFFICE.

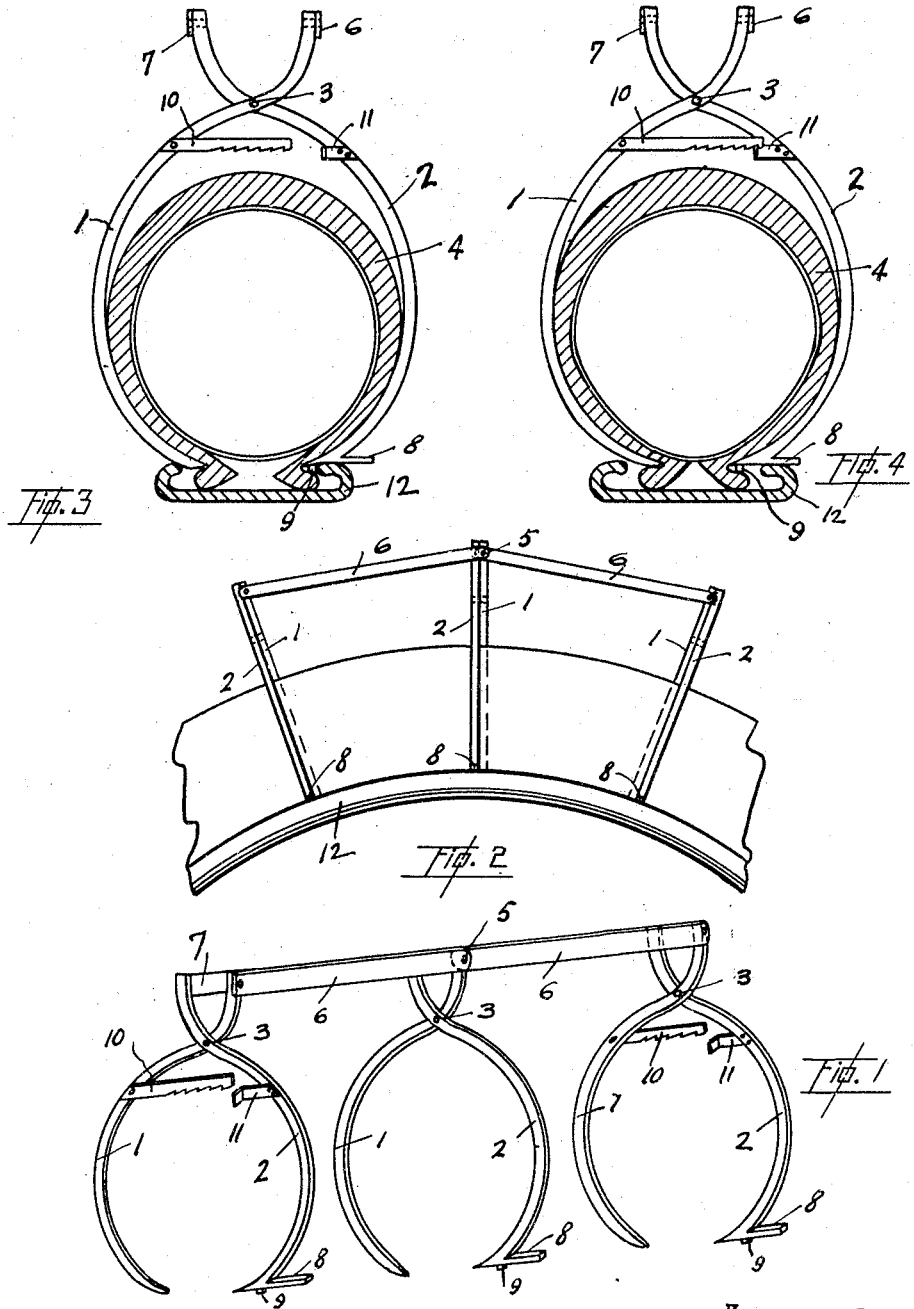

JOHN AYLING, OF VANCOUVER, BRITISH COLUMBIA, CANADA.

TIRE-TOOL.

1,326,830.  Specification of Letters Patent.  Patented Dec. 30, 1919.

Application filed December 20, 1918. Serial No. 267,628.

*To all whom it may concern:*

Be it known that I, JOHN AYLING, a subject of the King of Great Britain, and a resident of the city of Vancouver, in the Province of British Columbia, Canada, have invented certain new and useful Improvements in Tire-Tools, of which the following is a specification.

My invention relates to improvements in tire tools, and the object of my invention is to provide a simple, inexpensive, and practical device by means of which pneumatic tires may be easily removed from the wheel and as easily replaced in an expeditious and efficient manner and without the use of any other tool.

I attain this object by the construction illustrated in the accompanying drawings in which—

Figure 1 is a perspective view of my device.

Fig. 2 is a fragmentary side view of a tire showing the device in position thereon.

Figs. 3 and 4 are views illustrating the practical application of the invention.

Similar figures of reference indicate similar parts throughout the several views.

The device consists of three pairs of tong-like gripping members 1 and 2, the members of each pair of which are pivotally connected together at 3, their lower ends being curved to conform to the curvature of tires 4, while the upper ends of the end pairs are pivotally connected as at 5 to the upper ends of the center pair by means of handle bars 6 and 7, from which it will be seen that the end pairs may be swung up or down, as the case may be so as to readily accommodate themselves to tires of different diameters when being placed thereon. The lower end of each member 2 is provided with a flat outwardly projecting extension 8 forming a rim bearing-plate, from the underside of which projects a lug 9, as shown in Figs. 1, 3 and 4. 10 indicates a notched lever carried by the member 1 of each end pair adapted to coöperate with a plate 11 secured to member 2 by means of which the two arms may be locked together when necessary. 12 indicates the rim.

The manner in which the tool is used and its utility will be apparent on reference being had to Figs. 1, 3 and 4 and may be described briefly as follows. To remove a tire the gripping members are placed around it as shown and the lower end of each member 2 is inserted between the tire and the rim so that the lugs 9 engage the edge of the rim, thus preventing the members 2 from slipping outwardly and enabling the device, when the gripping members are then moved inwardly by strong hand pressure on the handles 6 and 7, these being grasped by both hands, and pulled over toward the operator, to be used like a lever to raise and pull the portion of the tire gripped by the members 1 and 2 over the rim, the fulcrum for such lever being provided by the bearing of the plates 8 on the rim. In like manner the plates 8 serve as bearings for the gripping members when replacing the tire, which is accomplished by first of all arranging the major portion of it around the rim, then gripping the remaining portion by the members 1 and 2, locking them if desired by means of lever 10, and plate 11, and raising and passing it over the rim, the plates 8 sliding on the rim so that the gripped portion goes fairly into place at all points.

From the foregoing it will be seen that I have devised a simple and efficient tool the use of which enables pneumatic tires to be removed and replaced with great ease and convenience and without the use of tire irons or any other tools.

What I claim as my invention is:—

1. A tire tool comprising two or more pairs of pivotally connected gripping members the lower ends of which are curved to conform to the curvature of a pneumatic tire, one lower end of each pair being adapted to bear on the tire rim so that a fulcrum is provided for the tool whereby the same may be used to lever off the portion of tire gripped thereby, and connecting bars between the upper ends of said members forming gripping handles for the tool.

2. A tire tool comprising three pairs of pivotally connected gripping members the lower ends of which are curved to conform to the curvature of a pneumatic tire, one lower end of each pair being adapted to bear on the tire rim so that a fulcrum is provided for the tool whereby the same may be used to lever off the portion of tire gripped thereby, and connecting bars between the upper ends of the said members forming gripping handles for the tool, said bars being pivotally connected to the center pair of members.

Dated at Vancouver, B. C., this 9th day of December, 1918.

JOHN AYLING.